T. G. Palmer,
Derrick,
No. 43,925. Patented Aug. 23, 1864.

Witnesses.
Inventor:
T. G. Palmer

UNITED STATES PATENT OFFICE.

TIMOTHY G. PALMER, OF GREENEVILLE, NEW YORK.

IMPROVEMENT IN DERRICKS FOR STACKING HAY.

Specification forming part of Letters Patent No. 43,925, dated August 23, 1864.

*To all whom it may concern:*

Be it known that I, TIMOTHY G. PALMER, of Greeneville, in the county of Greene and State of New York, have invented, made, and applied to use a certain new and useful Improvement in Derricks for Stacks or Ricks of Hay or Grain; and I do hereby declare the following to be a full, clear, and exact description of the said invention, reference being had to the annexed drawings, making part of this specification, wherein—

Figure 2:
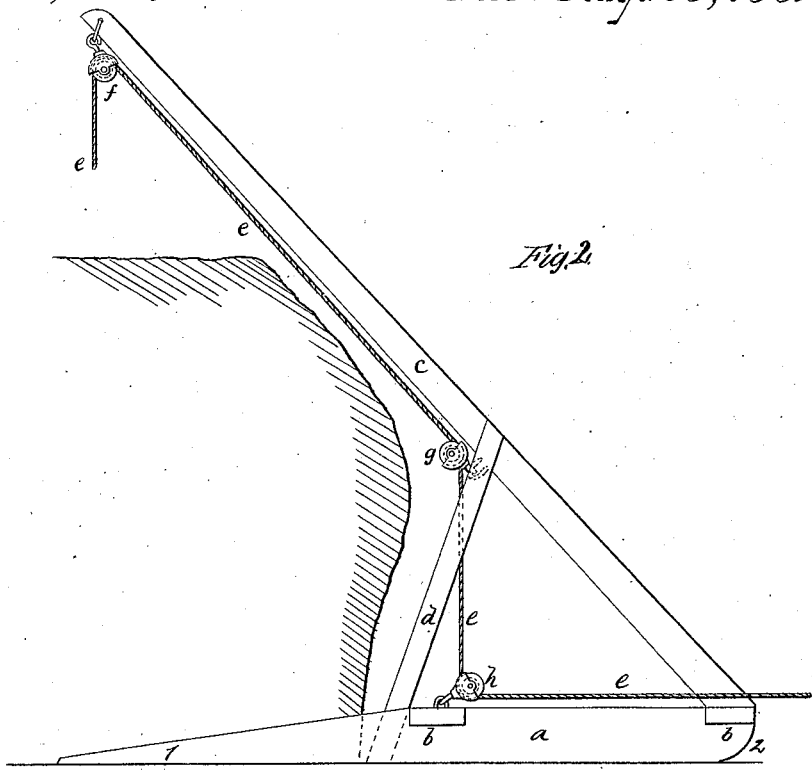
Figure 1:
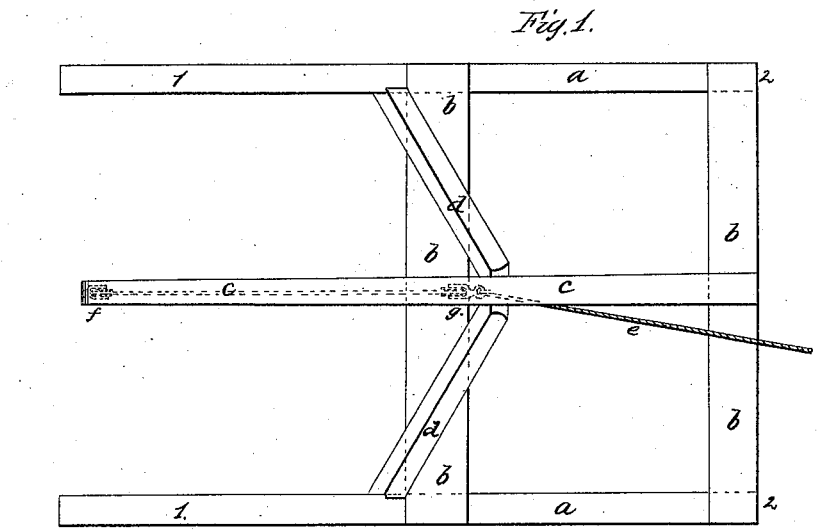

Figure 1 is a plan of said derrick; and Fig. 2 is an elevation of the same as in place for use.

Similar marks of reference denote the same parts.

Derricks have heretofore been used for forming stacks or ricks of hay or grain, by which derricks the material is raised off the ground or a cart and deposited properly upon the stack or rick, and hay forks or elevators adapted to such work and well known are employed at the end of the hoisting-rope for elevating and discharging such material.

The nature of my said invention consists in a derrick formed with beveled sills that extend forward of the braces that support the beam or arm and upon which the rick or stack is formed, and said sills are also beveled on the under sides at the back end, so that the derrick can be withdrawn after the stack or rick is formed and then moved to another place.

In the drawings, $a\ a$ are the sills, that are united by the cross-pieces $b\ b$. Said sills are beveled, as at 1 1, so that they will draw out easily from under the hay or grain, and beveled or rounded, as at 2 2, so that the sills will slide easily over the ground when drawn back. $c$ is the arm or beam sustained by the braces $d\ d$, and $e$ is a hoisting-rope passing from the ordinary hay-elevating fork through the pulley $f$ at the upper end of the arm $c$, thence along adjacent to the said arm to the pulley $g$, and from that through the pulley $h$ on the cross-piece $b$, to the horse or other animal employed to draw up the hay or grain to be piled on the stack or rick.

It will be seen that the derrick can be withdrawn after the stack or rick is formed, that while in use there is no tendency for said derrick to upset, and that the hoisting-rope is not in the way of forming the stack or rick. The pulley $h$ may be dispensed with and the pulley $g$ be placed at the foot of the beam or arm $c$, and the rope will travel adjacent to it, out of the way of the hay or grain forming the stack or rick. An inclined board may be employed, up which the hay or grain can be drawn by the fork or rake and deposited on the top of the stack, and said incline may be sustained by braces to the arm $c$, or otherwise.

What I claim, and desire to secure by Letters Patent, is—

The combination of the derrick and framework, when the latter is constructed with the beveled sills $a\ a$, passing forward of the braces $d\ d$, that sustain the arm $c$, in the manner specified, so that the derrick and its beveled sills can be withdrawn from the stack when formed, as specified.

Dated this 18th day of March, A. D. 1864.

T. G. PALMER.

Witnesses:
LEMUEL W. SERRELL,
CHAS. H. SMITH.